United States Patent
Lamber et al.

(10) Patent No.: US 6,358,357 B1
(45) Date of Patent: **\*Mar. 19, 2002**

(54) PACKAGING ADHESIVE MIXTURES FOR CONTROLLED GAS BARRIER PROPERTIES

(75) Inventors: Robert M. Lamber, Woodstock; H. Dale Sherman, Wonder Lake, both of IL (US)

(73) Assignee: Morton International, Inc., Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,413

(22) Filed: Jul. 7, 1997

Related U.S. Application Data

(63) Continuation of application No. 08/507,956, filed on Jul. 27, 1995, now abandoned.

(51) Int. Cl.[7] .............................................. C09J 101/00
(52) U.S. Cl. ........................ 156/333; 426/127; 524/501
(58) Field of Search ........................ 156/333; 426/127; 524/501

(56) References Cited

U.S. PATENT DOCUMENTS

| | | | | |
|---|---|---|---|---|
| 3,274,328 A | * | 9/1966 | Davis | 427/96 |
| 3,753,828 A | * | 8/1973 | Manne et al. | 156/333 |
| 4,032,487 A | * | 6/1977 | Columbus | 428/426 |
| 4,619,960 A | * | 10/1986 | Dodge | 524/501 |
| 4,762,731 A | * | 8/1988 | Lancaster et al. | 427/208.2 |
| 5,468,526 A | * | 11/1995 | Allen et al. | 156/308.2 |

FOREIGN PATENT DOCUMENTS

| | | | | |
|---|---|---|---|---|
| EP | 0119698 | | 9/1984 | |
| EP | 0185464 | | 6/1986 | |
| GB | 1110055 | | 4/1968 | |
| JP | 55-95564 | * | 7/1980 | 156/333 |
| JP | 4-238771 | * | 1/1992 | 524/501 |

OTHER PUBLICATIONS

Abstracts, JP820202043 Nov. 19, 1982.

Chemical Abstracts, 14168h, Japan 70–36, 439, Nov. 19, 1970.

* cited by examiner

Primary Examiner—John J. Gallagher
(74) Attorney, Agent, or Firm—Stephen T. Falk

(57) ABSTRACT

A higher-barrier acrylic/chlorinated vinyl or acrylic/chlorinated vinyl/vinyl latex adhesive component and a lower-barrier acrylic or acrylic/vinyl latex adhesive component are mixed in relative proportions and used to adhere films of low-barrier material, such as films of polyolefins, thereby providing an adhesive layer of controlled gas barrier properties.

6 Claims, No Drawings

PACKAGING ADHESIVE MIXTURES FOR CONTROLLED GAS BARRIER PROPERTIES

This is a continuation of application Ser. No. 08/507,956 filed on Jul. 27 1995, now abandoned.

The present invention is directed to mixtures of adhesive components, in particular mixtures of acrylic or acrylic/vinyl latex adhesive components, one of which latex adhesive components is formed from a substantial portion of chlorinated vinyl monomers. The mixture of adhesive components provides packaging material with controlled gas barrier properties.

BACKGROUND OF THE INVENTION

For many types of food packaging applications, such as packaging meats and cheeses, it is desirable that the packaging material transmit as little gas as possible. For such purposes, high gas barrier materials, such as nylon, ethylene/vinyl alcohol, or polyvinylidene chloride film or coatings may be employed.

On the other hand, certain foods, particularly fruits and vegetables, may maintain their freshness longest if the packaging material provides for some gas transmittance. Fruits and vegetables, though harvested, continue respiratory functions for an extended period of time, and packaging is preferably provided which allows the produce to breathe. Everyone is well acquainted with the nylon mesh bags in which citrus fruits are commonly sold, the porous bags allowing for complete exposure of the fruit to the atmosphere. Were citrus fruits to be packaged in air-tight bags, rapid rotting would occur.

Harvested fruits emit gases, particularly ethylene oxide, which hasten the fruits rotting. Air-tight packaging of fruits would, of course, result in build-up of concentrations of such gases. In fact, it is known that fruits are genetically programmed to produce such gases. A fruit is, after all, a vehicle for the species-regenerating seed, and if the fruit is not eaten and the seed thereby transported by an animal, rotting of the fruit is necessary for the seed to develop into a plant. Likewise vegetables continue some respiratory function after harvesting, though generally less than fruit.

Research has shown that different fruits and vegetables have different "breathing" requirements, and each fruit or vegetable may have its longest shelf life in packaging of specific gas barrier properties. There is a need therefore, for producers of packaging material to be able to adjust the gas barrier property of packaging material according to the specific packaging applications.

One proposed approach for adjusting gas barrier properties is to vary the thickness or gauge of the film or of specific layers of a film laminate. Manufactures of packaging materials, particularly of multilayer film laminates, have difficulty with this approach as it is difficult from standpoints both of material handling and apparatus adjustment considerations to change film layer thicknesses from one packaging application to another. The present invention is directed to mixtures of adhesive components, the proportions of which can be easily adjusted, to provide for controlled gas barrier properties.

SUMMARY OF THE INVENTION

In accordance with one aspect of the present invention, there is provided a mixture of a first, higher-barrier latex adhesive component comprising a polymer formed of monomers comprising acrylic monomers and chlorinated vinyl monomers and optionally, other vinyl monomers, and a second, lower-barrier latex adhesive component comprising a polymer formed of acrylic monomers and optionally, vinyl monomers, including chlorinated vinyl monomers. The gas barrier property of a film formed entirely from the higher-barrier latex adhesive component has an oxygen transmission (OTR) rate at least 50 cc $O_2/100$ in.$^2$/day (775 cc $O_2/(m^2/day)$), preferably at least 100 cc $O_2/100$ in.$^2$ day (1550 cc $O_2/(m^2/day)$) and most preferably at least 200 cc $O_2/100$ in.$^2$/day (3100 cc $O_2/m^2/day$) lower than does a film formed entirely from the lower-barrier adhesive component. Herein, the OTR's are based upon a coating weight of 3.5 lbs/ream (3.5 lbs/3000 ft$^2$) (5.71 kg/1000 m$^2$), this being a common coating weight. The polymer of the first latex adhesive component comprises between about 5 and about 95 wt % of the combined weight of the polymers of the first and second latex adhesives, and the polymer of the second latex adhesive component comprises between about 95 and about 5 wt % of the combined weight of the polymers of the first and second latex adhesives, whereby the gas barrier properties of a film formed from the latex adhesive mixture is intermediate of a film formed from either the first or the second latex adhesive component alone.

Another aspect of the invention is a method of producing a multi-layer laminate with an adhesive layer having controlled gas barrier properties by adhering two or more film layers having low gas barrier properties with a latex adhesive having greater gas barrier properties. The composition of the latex adhesive is prepared by using an appropriate amount of a first latex adhesive component having higher-barrier properties and an appropriate amount of a second latex adhesive component having lower-barrier properties so as to provide an adhesive layer with an OTR ranging anywhere from that of the higher-barrier latex adhesive component to that of the lower-barrier latex adhesive component.

DETAILED DESCRIPTION OF CERTAIN PREFERRED EMBODIMENTS

Herein the gas barrier properties of an adhesive layer are described in terms of its oxygen transmission rate (OTR) based on a coating weight of 3.5 lbs/3000 ft$^2$. Although other gases, such as $CO_2$, ethylene, and ethylene oxide, are also factors in food product freshness, the transmission rate of these gases will vary generally in the direction that the oxygen transmission rate varies. The gas barrier property of a multi-layer (2 or more layers) packaging laminate depends, of course, not only on the gas barrier property of the adhesive layer or layers, but on the gas barrier properties of the film layers as well as the adhesive. However, the present invention is primarily applicable to laminates in which all of the film layers have poor gas barrier properties relative that which is to be provided by to the adhesive layer. Most particularly, the invention is directed to multi-layer laminates formed of sheets of polyolefins, such as polyethylene and polypropylene. Polyolefins have poor gas barrier properties, typically having OTRs in the range of 50–500 cc $O_2/100$ in.$^2$/day/mil (775–7750 cc $O_2/m^2/day/mil$ 0.025 mm). Such sheets may be the of the same or different polymers. Herein, therefore, gas barrier property is discussed in relation only to that of the adhesive layer provided by a latex adhesive applied at a coating weight of 3.5 lbs/3000 ft$^2$. The producer of the packaging material will also have to factor in the gas barrier properties of the film layers in adapting the packaging to specific applications.

The terms "higher-barrier" and "lower-barrier" as used herein to describe the latex adhesive components, are relative terms, one adhesive component having significantly greater gas-barrier properties than the other.

The optimal OTR for most fruits and vegetables ranges from about 50 to about 300, particularly from about 70 to about 225 cc/100 in$^2$/day (775–4650, preferably 1085–3488 cc O$_2$/m$^2$/day), and the invention is primarily directed to providing OTRs in these ranges, although the OTR may be varied over any range to which latex adhesive components of the type described herein are capable of providing.

Suitable acrylic monomers for forming both the higher-barrier and lower-barrier adhesive components include, but are not limited to acrylic acid, methacrylic acid, and $C_1$–$C_{12}$-alkyl esters of acrylic and methacrylic acid. The higher-barrier latex adhesive component also is formed in part from chlorinated vinyl monomers, such as vinyl chloride and, preferably, vinylidene chloride. It is believed that the large chlorine molecules contribute to dense polymer packing and therefore enhanced gas barrier properties. Vinylidene chloride is preferred to vinyl chloride for forming the higher-barrier latex adhesive component because it contains two chlorine molecules and is a liquid, as opposed to gaseous vinyl chloride, at ambient temperatures. Either or both of the adhesive components may also contain co-polymerizable vinyl monomers, such as vinyl acetate.

The polymer of the higher-barrier latex adhesive component is typically formed from between about 40 and about 95 wt % vinylidene chloride and/or vinyl chloride, preferably from about 50 to about 95 wt % vinylidene chloride and/or vinyl chloride. The higher-barrier latex adhesive component is formed from between about 5 to about 60 wt % of acrylic monomer(s), preferably from about 5 to about 50 wt %. The higher-barrier latex adhesive component may further be formed from up to about 55 wt % copolymerizable vinyl monomer. The higher-barrier latex adhesive component need not contain acid functionality, but may be formed from up to about 5% monomer having carboxylic acid functionality. Although not required, the higher-barrier latex component may have hydroxyl functionality, such as provided by hydroxy ethyl acrylate. Preferably, between about 2 and about 15 wt % of the monomer used to form the higher-barrier latex component has hydroxyl functionality. Hydroxyl functionality is believed to enhance adhesive properties. The polymer of the higher-barrier latex adhesive has a weight average molecular weight ranging from about 25 thousand to about 200 thousand.

The polymer of the lower-barrier latex adhesive component is formed primarily from acrylic monomers, i.e., from about 50 to 100 wt % acrylic monomers. The balance is formed from co-polymerizable vinyl monomers, such as vinyl acetate. Like the higher-barrier latex adhesive component, the polymer of the lower-barrier adhesive component may be formed, in part, from vinylidene chloride and/or vinyl chloride, but the proportion is substantially lower than in the higher-barrier adhesive component. The lower-barrier latex adhesive component need not contain acid functionality, but may be formed from up to about 10 wt % monomer having carboxylic acid functionality. Although not required, the lower-barrier latex component may have hydroxyl functionality, such as provided by hydroxy ethyl acrylate. Preferably, the hydroxyl value of the lower-barrier latex adhesive component is formed from about 2 to about 10 wt % of monomer having hydroxyl functionality. The polymer of the lower-barrier latex adhesive has a weight average molecular weight ranging from about 20 million to about 100 million.

In addition to the polymer, both the higher-barrier latex adhesive component and the lower-barrier latex component include surfactants in amounts sufficient to emulsify the polymers and maintain an aqueous emulsion of the polymers. The surfactants are typically anionic surfactants and/or non-ionic surfactants. Some useful anionic surfactants include Rhodocal® DS-10 and Arosol® MA-80. Some useful non-ionic surfactants include CO 660 Igepal® and Triton® X 405. In both the lower-barrier adhesive component and the higher-barrier adhesive component, the surfactant is typically used at between about 0.1 and about 5 wt %, relative to the weight of the polymer.

The latex adhesive components are formed by any conventional means of forming latex polymers. Most conveniently, the latex adhesive components are formed by conventional emulsion polymerization in aqueous media, whereby a latex is formed in situ. The latex adhesive components may also be commercially available latex adhesives, provided that two latex adhesives are available which individually form adhesive layers having sufficiently different gas barrier properties.

In application, a producer of packaging material will be supplied with two adhesive components which individually form adhesive layers with different OTRs that bracket the OTR range required for multiple packaging applications. Although, for some packaging needs, either the higher-barrier adhesive component or the lower-barrier component may be used alone to provide the desired gas barrier property, intermediate gas barrier properties are obtained by mixing appropriate amounts of the two latex adhesive components. Generally, one or the other of the components must be used at least about 5 wt % (based on total polymer content of the two components) to have significant modification of gas barrier properties of the other component. The gas barrier provided by mixtures of the two components is generally linear. In any case, for any given mixture of two known components, a gas barrier curve may be pre-determined. Such curves prove to be quite reproducible. Thus, a manufacturer of packaging material, when switching from one packaging application to another, each having different optimal gas barrier requirements, need only meter out different relative amounts of the two components. Because the gas barrier properties of the adhesive layer are variable, film type, film thickness, and coating weight need not be changed when shifting from one packaging application to another.

Latex components of the type used in accordance with the present invention are found to have good compatibility with each other. This is not always the case when mixing different latexes. Coagulation frequently is a problem with mixed latexes, even latexes of the same general type. Latex components of the type used in accordance with the present invention form homogeneous adhesive layers without tendency to separate into separate phases. This compatibility is believed to be responsible for attaining a substantially linear, highly predictable relationship between relative amounts of the two latex adhesive components and the gas barrier properties of a film formed from the mixture.

Another advantage of the system of the present invention is that the gas-barrier properties of a film which is formed, while dependent on relative amounts of the higher-barrier and lower-barrier components, tends to be relatively independent of coating weight. Coating weights of the adhesive are typically between about 2 and about 5 lbs per ream (2–5 lbs per 3000 ft$^2$) (3.26–8.15 kg/100 m$^2$), 3.5 lbs per ream being a very typical coating weight. However, achieving exact coating weight consistency is difficult to achieve, and coating weight may vary up to 20% in either direction during a lamination process. Within the normal range of coating variation, the gas barrier properties of the adhesive layer which is formed tends to be quite uniform.

Packaging laminates are formed from sheets of polymer and the latex adhesive in conventional manners, typically a drybond laminating process. The aqueous emulsion is applied to one film, dried to form an adhesive layer, and then brought in contact with the other film. The solids of the adhesive components and the final adhesive mixture may range from about 35 to about 60 wt % solids, 46% solids being typical. For simplicity, it is preferred that each of the adhesive components prior to mixing be at about the same solids level so that the mixture has a similar solids level, regardless of the relative proportions of the two components.

The invention will now be described in greater detail by way of specific Examples.

EXAMPLE 1

A higher-barrier latex adhesive component is prepared from the following monomer mix and redox mix:

| MONOMER MIX | |
|---|---|
| wt % | Monomer |
| 60 | vinylidene chloride |
| 30 | 2-ethyl hexyl acrylate |
| 10 | hydroxy ethyl acrylate. |

| REDOX REAGENTS | |
|---|---|
| Parts/100 Monomer | |
| 0.10 | ammonium persulfate |
| 0.20 | hydrogen peroxide (35%) |
| 0.27 | erythorbic acid |

Following is the protocol for preparing the higher-barrier latex adhesive component.

Prepare the following solutions.

| 1. | Gafac ® RE960[1] | 10.0 gms. |
|---|---|---|
|    | deionized water | 89.1 gms. |

[1]anionic surfactant

Neutralize this solution to pH 6.5–6.8 with

|   | deionized water | 3.6 gms. |
|---|---|---|
|   | aqueous ammonia | 1.9 gms. |
| 2. | deionized water | 107.0 gms. |
|   | Aerosol ® A-196[2] (97%) | 12.2 gms. |
|   | Igepal ® CO 887[3] (70%) | 6.3 gms. |

[2]anionic surfactant
[3]non-ionic surfactant

To prepare the pre-emulsion load the following

| deionized water | 743.7 gms. |
|---|---|
| sodium salt of SEM (5%) | 888.1 gms. |
| solution 1 | 104.6 gms. |
| solution 2 | 125.5 gms. |
| deionized water | 82.4 gms. |

Mix well, and under agitation add the following;

| hydroxy ethylacrylate | 450.5 gms. |
|---|---|
| 2 ethyl hexylacrylate | 889.2 gms. |
| vinylidene chloride | 3115.8 gms. |

Agitate until a stable pre-emulsion is formed.

| REACTOR CHARGE | | |
|---|---|---|
| Prepare the following solutions; | | |
| 3. | ammonium citrate, dibasic | 6.6 gms. |
|    | deionized water | 8.9 gms. |
| 4. | Igepal ® CO 887 (70%) | 15.8 gms. |
|    | deionized water | 26.8 gms. |
| 5. | Aerosol ® A-196 (97%) | 3.9 gms. |
|    | deionized water | 26.8 gms. |
| 6. | Erythorbic acid | 10.2 gms. |
|    | deionized water | 935.9 gms. |
| 7. | hydrogen peroxide (35%) | 18.7 gms. |
|    | deionized water | 267.4 gms. |

To load kettle, add the following;

| deionized water | 2050.0 gms. |
|---|---|
| solution 3 | 15.5 gms. |
| ammonium persulfate | 4.5 gms. |
| solution 4 | 42.6 gms. |
| solution 5 | 30.7 gms. |
| deionized water | 71.3 gms |

Heat reactor to 46–48° C. and add;

| hydrogen peroxide (35%) | 4.5 gms. |
|---|---|

Charge to reactor;

| pre-emulsion (seed charge) | 128.4 gms. |
|---|---|

Mix and stabilize temperature at 46–48° C.; then start activator charge (sol.6), to be added over 11.6 hours.

After 15 minutes, start pre-emulsion feed at 35.5 gms/10 min.

After 10 minutes, increase feed to 70.6 gms./min.

After 20 minutes, increase rate to 107.0 gms./min. (approx add time 450 minutes).

After 105 minutes begin initiator charge (sol.7) at 6 gms./10 min. (approx. add time 450 minutes).

When pre-emulsion add is finished, flush lines with 64.2 gms. deionized water.

After rinse is complete, add the following to the kettle;

| deionized water | 17.8 gms. |
|---|---|
| hydrogen peroxide (35%) | 1.2 gms. |

Follow with rinse;

| | |
|---|---|
| deionized water | 8.9 gms. |

Maintain temp. at 46–48° C. for 30–35 minutes, then heat to 64–67° C.
At 64–67° C. add the following;

| | | |
|---|---|---|
| 9. | deionized water | 8.9 gms. |
| | hydrogen peroxide (35%) | 1.2 gms. |
| | deionized water rinse | 8.9 gms. |
| 10. | deionized water | 17.6 gms. |
| | erythorbic acid | 3.6 gms. |
| | deionized water rinse | 8.9 gms. |

Hold temperature at 64–67° C. for one hour. Then cool to 27–30° C.
Adjust pH to 2.0–2.5 with aqueous ammonia; add in 5.0 gm increments.
Filter and check physicals which should meet the following criteria;

| | |
|---|---|
| Solids | 44.0–46.0% |
| pH | 2.0–2.5 |
| wt/gallon | 10.00 lbs. |

This adhesive component, if used alone to form a film at a 3.5 lbs/3000 ft$^2$ coating weight, has an OTR of 75 cc $O_2$/100 in.$^2$/day (1159 cc $O_2$/m$^2$/day).

EXAMPLE 2

A lower-barrier latex adhesive component is prepared from the following monomer mix:

| wt % | MONOMER MIX |
|---|---|
| 71 | butyl acrylate |
| 17 | vinyl acetate |
| 6 | hydroxy ethyl acrylate |
| 6 | acrylic acid. |

| REDOX AGENTS parts/100 monomer mix | COMPONENT |
|---|---|
| 0.44 | ammonium persulfate |
| 0.03 | hydrogen peroxide (35%) |
| 0.38 | erythorbic acid |

Following is the protocol for preparing the lower-barrier adhesive component.

Pre-emulsion

To a mix tank add the following materials;

| | |
|---|---|
| deionized water | 1114.6 gms. |
| sodium borate | 13.9 gms. |

*-continued*

| | |
|---|---|
| Triton X 405[4] (70%) | 108.0 gms. |
| Aerosol A-196 (97%) | 23.0 gms. |
| sodium salt of SEM (5%) | 470.9 gms. |
| butyl acrylate | 3435.7 gms. |
| vinyl acetate | 651.3 gms. |
| hydroxy ethylacrylate | 280.7 gms. |
| acrylic acid | 280.7 gms. |
| deionized water (rinse) | 97.5 gms. |

[4]non-ionic surfactant

Mix until a stable pre-emulsion is formed.

Reactor Charge

| | |
|---|---|
| deionized water | 1949.8 gms. |
| sodium borate | 4.6 gms. |
| Triton X 405 (70%) | 5.6 gms. |
| Aerosol A-196 (97%) | 0.6 gms. |
| 1% iron solution | 4.6 gms. |

Heat reactor to 50–53° C.
While reactor is heating up prepare the following solutions.

| | | |
|---|---|---|
| 1. | deionized water | 31.9 gms. |
| | ammonium persulfate | 9.3 gms. |
| 2. | deionized water | 243.7 gms. |
| | ammonium persulfate | 11.1 gms. |
| 3. | deionized water | 493.2 gms. |
| | erythorbic acid | 17.4 gms. |

With reactor at 50–53° C., a stable pre-emulsion, and the three solutions prepared:
A. Charge solution 1 to the reactor
B. Begin addition of solution 3 over 8 hours.
C. Begin addition of pre-emulsion over 7 hours.
Thirty minutes after starting pre-emulsion, begin adding solution 2 over 6.5 hours.
Maintain temperature at 50–53° C. during addition;
Just prior to the end of the pre-emulsion and solution 2, prepare the following solution.

| | | |
|---|---|---|
| 4. | deionized water | 29.0 gms. |
| | hydrogen peroxide (35%) | 5.2 gms |

When pre-emulsion and solution 2 are finished, begin addition of solution 4 to the kettle over 30 minutes.
When solution 4 is completed, solution 3 should last another thirty minutes.
When all solutions are exhausted, maintain at 50–53° C. for one hour. Cool to ambient temperature and check physicals. Adjust solids as required with deionized water; add as required.

Target Physical Properties

| | |
|---|---|
| solids | 49.0–51.0% |
| pH | 2.0–3.0 |
| viscosity | 350.0 cps. max. |
| wt./gallon | 8.7# |

This adhesive component, is used alone to form a film at a 3.5 lbs/3000 ft$^2$ coating weight, has an OTR of 240 cc $O_2$/100 in.$^2$/day (3720 cc $O_2$/m$^2$/day).

EXAMPLE 3

The latex adhesive components of Example 1 and 2 are admixed in various proportions (proportions based on polymer content of each component). The mixtures are used to laminate two films of polyethylene. The OTRs of the films provided by the mixtures are described in the table below:

| Wt % Higher-barrier component | OTR (cc $O_2$/(100 in.$^2$/day) |
|---|---|
| 90 | 113 |
| 80 | 167 |
| 70 | 198 |

What is claimed is:

1. A method of making a laminate comprising a first and a second sheet of polymeric material adhered with an adhesive layer of controlled oxygen transmission rate, the method comprising providing a first aqueous latex acrylic-based adhesive component capable of forming a film with a first oxygen transmission rate when applied at a coating weight of 3.5 lbs/3000 ft$^2$, said first latex adhesive component comprising polymer formed from a monomer mixture comprising between about 40 and about 95 wt % vinylidene chloride, between about 5 and about 60 wt % acrylic monomers, and from 0 to about 55 wt % co-polymerizable vinyl monomers, plus sufficient surfactant to maintain an emulsion of said polymer, providing a second aqueous latex acrylic-based adhesive component capable of forming a film with a second oxygen transmission rate when applied at a coating weight of 3.5 lbs/3000 ft$^2$, said second latex adhesive component comprising polymer formed from between about 50 and about 100 wt % acrylic monomer, balance co-polymerizable vinyl monomer, plus sufficient surfactant to maintain an emulsion of said polymer, said first oxygen transmission rate being at least about 50 cc $O_2$/100 in.$^2$/day lower than said second oxygen transmission rate, mixing between about 70 and about 95 wt % of said first component with between about 5 and about 30 wt % of said second component in relative proportions according to the oxygen transmission rate required to form an adhesive composition mixture, and adhering said first sheet to said second sheet with said adhesive composition mixture.

2. A method according to claim 1 wherein said first and second sheets are polyolefins.

3. A method according to claim 1 wherein said first oxygen transmission rate is at least about 100 cc $O_2$/100 in.$^2$/day lower than said second oxygen transmission rate.

4. A method according to claim 1 wherein said first oxygen transmission rate is at least about 200 cc $O_2$/100 in.$^2$/day lower than said second oxygen transmission rate.

5. A method according to claim 1 wherein said adhesive mixture when applied at a coating weight of 3.5 lbs/300 ft$^2$ and dried provides an adhesive layer having an oxygen transmission rate of between about 50 and about 300 cc $O_2$/100 in.$^2$/day.

6. A method according to claim 1 wherein said adhesive mixture when applied at a coating weight of 3.5 lbs/300 ft$^2$ and dried provides an adhesive layer having an oxygen transmission rate of between about 70 and about 225 cc $O_2$/100 in.$^2$/day.

* * * * *